(12) United States Patent
Pardi

(10) Patent No.: US 10,572,213 B2
(45) Date of Patent: Feb. 25, 2020

(54) UNIVERSAL APPLICATION PINNING

(71) Applicant: Microsoft Technology Licensing, LLC, Redmond, WA (US)

(72) Inventor: William John Pardi, Edgewood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 15/090,393

(22) Filed: Apr. 4, 2016

(65) Prior Publication Data

US 2017/0286046 A1    Oct. 5, 2017

(51) Int. Cl.
| | | |
|---|---|---|
| *G06F 3/14* | (2006.01) | |
| *G06F 3/0484* | (2013.01) | |
| *G06F 3/0482* | (2013.01) | |
| *G09G 5/12* | (2006.01) | |
| *G06F 9/44* | (2018.01) | |
| *H04M 1/725* | (2006.01) | |

(52) U.S. Cl.
CPC .......... *G06F 3/1454* (2013.01); *G06F 3/0482* (2013.01); *G06F 3/04842* (2013.01); *G06F 9/44* (2013.01); *G09G 5/12* (2013.01); *G09G 2370/02* (2013.01); *H04M 1/72586* (2013.01)

(58) Field of Classification Search
CPC ........ G06F 3/1454; G06F 3/0482; G06F 9/44; G06F 3/04842; G09G 5/12; G09G 2370/02; H04M 1/72586
See application file for complete search history.

(56) References Cited

U.S. PATENT DOCUMENTS

| | | | |
|---|---|---|---|
| 8,028,040 B1 * | 9/2011 | Hobbs | G06F 9/45558 370/389 |
| 8,694,686 B2 * | 4/2014 | Roth | H04L 67/38 709/203 |
| 8,856,502 B2 | 10/2014 | Barrus et al. | |
| 9,055,120 B1 * | 6/2015 | Firman | G06F 8/60 |
| 9,229,918 B2 | 1/2016 | Zaman et al. | |
| 9,432,455 B2 * | 8/2016 | Jeide | H04L 67/1095 |
| 2007/0143446 A1 | 6/2007 | Morris | |
| 2009/0055758 A1 * | 2/2009 | Sim | G06F 9/451 715/762 |
| 2011/0231878 A1 | 9/2011 | Hunter et al. | |
| 2011/0321028 A1 * | 12/2011 | Evans | G06F 8/61 717/170 |
| 2012/0159472 A1 * | 6/2012 | Hong | H04L 12/1813 717/178 |
| 2012/0304108 A1 | 11/2012 | Jarrett et al. | |
| 2013/0124619 A1 | 5/2013 | Steakley | |
| 2013/0145286 A1 | 6/2013 | Feng et al. | |

(Continued)

OTHER PUBLICATIONS

Nathan, Adam, "Universal Windows Apps with XAML and C# Unleashed", In Sams Publishing, Feb. 3, 2015, 1 page.

(Continued)

*Primary Examiner* — Ryan F Pitaro

(57) ABSTRACT

Examples of the disclosure provide a system and method for universal application pinning. Application representations are pinned to a same location of a user interface across multiple selected user devices from a selectable device list generated based off the application type and compatible device types. In this way, a single pinning selection received at one device may be applied to multiple selected devices.

20 Claims, 10 Drawing Sheets

(56) References Cited

U.S. PATENT DOCUMENTS

| | | | |
|---|---|---|---|
| 2013/0254291 A1* | 9/2013 | Park | H04L 65/403 709/204 |
| 2013/0326502 A1 | 12/2013 | Brunsman et al. | |
| 2014/0032722 A1* | 1/2014 | Snow | G06F 9/4445 709/220 |
| 2014/0075283 A1* | 3/2014 | Coursol | G06F 17/3089 715/234 |
| 2014/0149573 A1* | 5/2014 | Tofighbakhsh | H04L 69/329 709/224 |
| 2014/0298250 A1 | 10/2014 | Zaman et al. | |
| 2014/0331147 A1 | 11/2014 | Jain et al. | |
| 2014/0344739 A1* | 11/2014 | Yoon | G06F 17/30884 715/769 |
| 2014/0344862 A1* | 11/2014 | Cho | H04N 21/4826 725/46 |
| 2014/0359602 A1 | 12/2014 | Sawaya et al. | |
| 2014/0359721 A1 | 12/2014 | Alphin et al. | |
| 2015/0026615 A1* | 1/2015 | Choi | G06F 3/0484 715/765 |
| 2015/0128042 A1 | 5/2015 | Churchill et al. | |
| 2015/0189070 A1* | 7/2015 | Baker | H04M 1/72572 715/738 |
| 2015/0222946 A1* | 8/2015 | Lee | H04N 5/44543 725/47 |
| 2015/0326655 A1* | 11/2015 | Quan | H04L 67/104 709/201 |
| 2016/0085385 A1* | 3/2016 | Gao | G06Q 10/109 715/814 |
| 2016/0110152 A1* | 4/2016 | Choi | G06F 3/04817 345/2.3 |
| 2016/0117072 A1* | 4/2016 | Sharifi | G06F 3/04842 715/769 |
| 2016/0162270 A1* | 6/2016 | Kumar | G06F 8/61 717/177 |
| 2016/0162972 A1* | 6/2016 | Abramson | G06Q 30/0631 705/26.7 |
| 2016/0197773 A1* | 7/2016 | Pandrangi | H04L 41/0803 709/217 |
| 2016/0378455 A1* | 12/2016 | Lochan | G06F 8/65 717/169 |
| 2017/0188213 A1* | 6/2017 | Nirantar | G06F 9/547 |
| 2017/0277549 A1* | 9/2017 | Soni | G06F 3/04842 |
| 2017/0329690 A1* | 11/2017 | Cudak | G06F 11/3409 |

OTHER PUBLICATIONS

"Screen pinning 3rd party apps programmatically", Retrieved on: Jan. 21, 2016, 2 pages. Available at: http://stackoverflow.com/questions/28204829/screen-pinning-3rd-party-apps-programmatically.

"Settings + Personalization", Published on: May 7, 2014, 3 Pages. Available at: http://www.windowsphone.com/en-in/how-to/wp8/settings-and-personalization/pin-apps-to-start.

* cited by examiner

UNIVERSAL APPLICATION PINNING

BACKGROUND

Several operating systems provide icons or graphical representations of computer programs to provide a shortcut for executing the program on a computing device. These icons may be selected in lieu of manually searching for the program name in order to execute or run the program on the device. In some instances, these icons may include dynamic content related to the program that the icon represents.

Assigning an icon or a representation of an application to a specific location of a graphical user interface is generally referred to as pinning. Various operating systems provide for pinning an icon to a task bar, favorites bar, menu area, display location, or other specified area of a single user interface. These pinning functions are device-specific and user-driven, such that a user must pin an icon to a desired location of a user interface on each device separately, if the application that the icon represents exists for a desired device.

SUMMARY

Examples of the disclosure provide a system and method for universal application pinning. An application selection directed to pinning an application representation to a location of a user interface associated with a device is received at a pinning module. The device associated with the user interface corresponding to the application selection is identified. One or more other devices related to the identified device are determined to generate a user device list. One or more device types that the application representation is designed to run on are determined to generate a device type list, and based on the user device list and the device type list a selectable device list is generated. The selectable device list is output to the user interface associated with the device to provide for selection of at least one other device to pin the application representation to a substantially similar location of the user interface associated with the other device selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
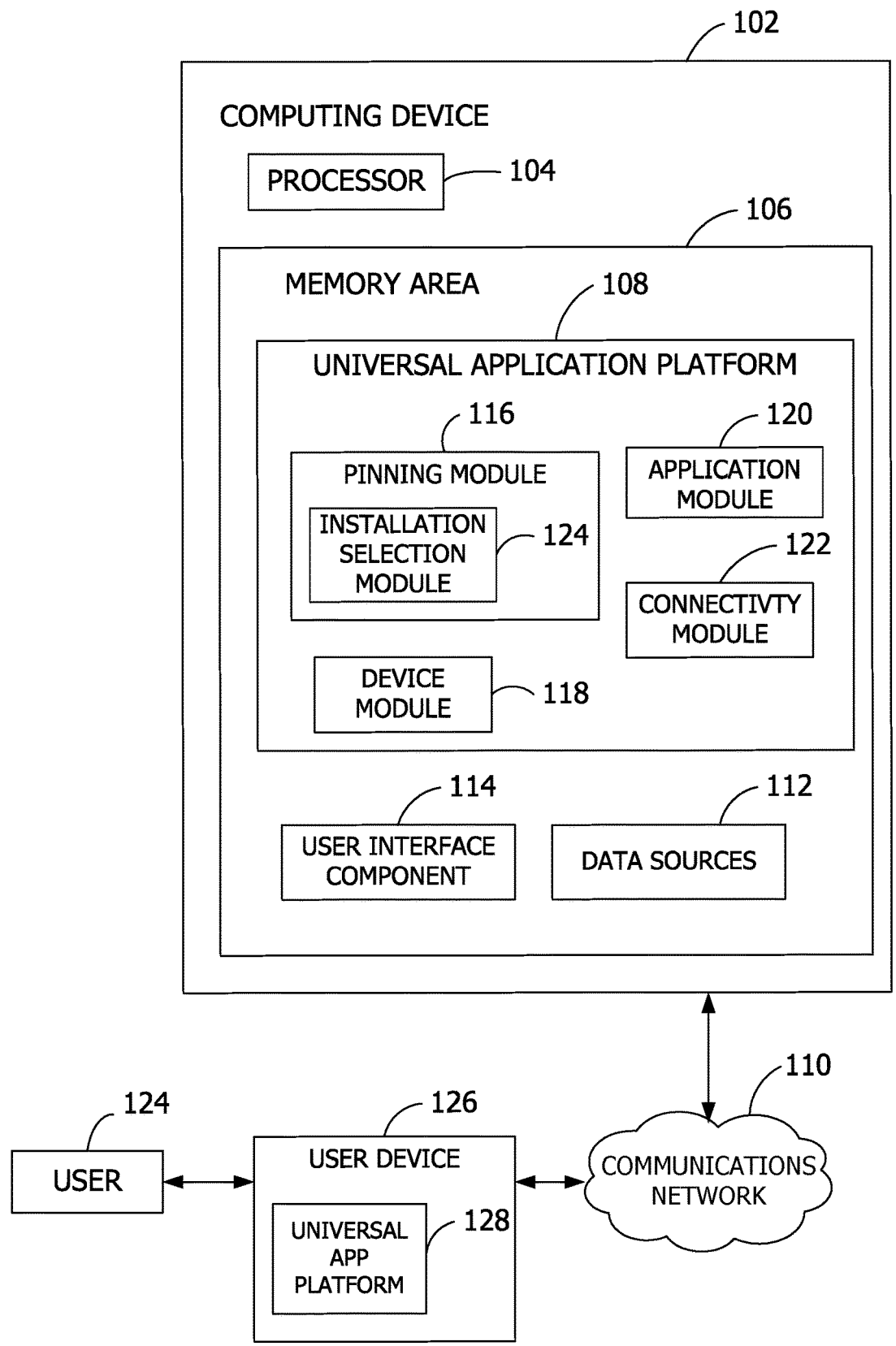
FIG. 1 is an exemplary block diagram illustrating a computing device for universal application pinning.

Referring to the figures, examples of the disclosure enable the universal pinning of an application across multiple devices via user interaction with a single device. Pinning an application, or a representation of an application, to a location of a user interface typically applies to the device a user interacts with initiate the application pinning, without affecting other user devices. An application representation, as user herein, may refer to an icon, a dynamic icon, a tile, a live tile, a widget, or any other suitable application representation. A live tile may show summary information or dynamic information associated with an application on a specific screen or menu of a user interface for certain device types. Universal pinning, as used herein, refers to pinning across multiple different devices and/or device types.

In some examples, universal pinning may be used in conjunction with universal applications, that is applications that are designed once for multiple device types corresponding to a singular operating system. In other examples, universal pinning may be used with applications that are designed once for multiple device types and/or multiple operating systems or platforms.

Aspects of the disclosure provide for automatic application pinning across multiple selected user-specific devices based on an application selection received via user interaction with a single user device. Because the application representation is automatically pinned to the user interface location across multiple selected devices based on a user selection from a selectable device list, there is reduced error rate at runtime of the application as there is less room for user error in pinning an application to an incompatible device, because the selectable device list is generated based on the selected application and device types compatible with the selected application.

Application representations are pinned to a location of a user interface across multiple selected user devices from a selectable device list generated based off the application type and compatible device types. Control over the application experience per device type is typically provided by a designer, such that the designer may dictate different application experiences across different device types for a single application at application development time, allowing the application to be pinned to different device types at run-time while providing device-appropriate user experiences for the application across multiple devices. In this way, a single pinning selection received at one device may be applied to multiple selected devices. Because the application representation is pinned automatically across the multiple selected devices, user efficiency and increased user interface functionality are provided. In addition, because the selected devices are selected from a list of available and application-appropriate devices, there is likely to be less error at application pinning and at application runtime.

Further, because the device selection for application pinning is driven by the system based on a selectable device list, aspects of the disclosure provide pinning selections that may be made with less intrinsic knowledge of the system, and of application and device types in general. A user may have no knowledge of compatibility between an application and a device type, yet by selecting to pin an application at one device, the universal pinning system informs the user of the application's compatibility with another device or device type and that the user has one or more other devices on which the selected application may be pinned. As such, examples of the disclosure expose additional utility of an application on multiple devices through a task already being performed on one device.

Aspects of the disclosure further enable increased user interaction performance and user efficiency via user interface interaction because user selection of devices for application pinning is driven by the system that also provides for user selection of whether to install upon pinning or install upon invoking the application representation. This also contributes to controlled data storage for increased performance, reduced processing load and/or increase processing speed by strategically managing computational, processing, memory, and/or other device resources. The effect of identifying where an application may be pinned, and when to actually install the application based on device resources, improves performance of the application as well as the device hosting the application. Additionally, some examples may conserve memory, reduce network bandwidth usage, improve operating system resource allocation, and/or improve communication between computing devices by streamlining at least some operations, such as data storage and data transmission, by automating at least some operations.

Referring again to FIG. 1, an exemplary block diagram illustrates a computing device for universal application pinning. In the example of FIG. 1, the computing device 102 represents a system for application pinning. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, wearable device, and/or portable media player. The computing device may also include less portable devices such as desktop personal computers, kiosks, tabletop devices, industrial control devices, wireless charging stations, electric automobile charging stations, and other physical objects embedded with computing resources and/or network connectivity capabilities. Additionally, the computing device may represent a group of processing units or other computing devices.

In some examples, the computing device has at least one processor 104, a memory area 106, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 4, FIG. 5, and FIG. 6).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include universal application platform 108, which may represent an application for pinning application representations of other executable applications to locations of a user interface. The applications may communicate with counterpart applications or services such as web services accessible via a network, such as communications network 110. For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The memory area may store data sources 112, which may represent data stored locally at memory area 106, data access points stored locally at memory area 106 and associated with data stored remote from computing device 102, or any combination of local and remote data.

The memory area further stores one or more computer-executable components. Exemplary components include a user interface component. The user interface component 114, when executed by the processor 104 of computing device 102, cause the processor 104 to perform operations, including to receive user selections during user interaction with universal application platform 108, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

Universal application platform 108 provides modules and components for application pinning and unpinning across multiple devices. In some examples, universal application platform 108 includes pinning module 116, device module 118, application module 120, and connectivity module 122. Pinning module 116 may receive an application selection directed toward pinning an application representation to a location of a user interface associated with a device and process the application selection to provide a selectable device list to the user interface for selection of at least one other device to pin the application representation to the same or substantially similar location of the user interface associated with the other device. For example, without limitation, a substantially similar location may be a start menu of each user interface, or a favorites section of a user interface for each device. In some examples, pinning module 116 is part of a graphical user interface displayed on a computing device. For example, pinning module 116 may detect a selection of an application via the graphical user interface, such as by a click on an application representation associated with the application, a search request for the application, or any other suitable application selection detection. Pinning module 116 may determine a user intent to pin or unpin the selected application based on user interaction with the selected application or application representation, such as dragging the selected application representation to a user interface location or clicking on a pin command or an unpin command associated with the selected application. In other examples, a user gesture may be detected and/or received by pinning module 116 and identified as a user intent to pin or unpin the selected application to or from a specific location of a user interface. For example, without limitation, a user gesture may be a right-click, a double tap via a touchscreen interface, a press and hold via an interactive interface, a drag and drop via an interactive interface, or any other suitable gesture. In still other examples, a verbal command may be received via an interactive user interface and obtained by pinning module 116, such as a verbal pin request associated with a selection of an application. In some illustrative examples, application selection and/or associated pinning or unpinning commands may be received by other components (not shown) and transmitted to or obtained by pinning module 116.

Device module 118 may include information corresponding to one or more devices associated with a user or user identifier, which may be stored as a user profile in some examples. In some examples, device module 118 may have access to device information associated with a user based on user credentials received via interaction with the graphical user interface detected by pinning module 116. In this example, device module 118 is located at memory area 106. In other example, device module may be located at a location remote from computing device 102 and accessible by universal application platform 108, such as in a cloud storage location. Device module 118 determines one or more devices related to the device that initiated the pinning request or application selection and generates a user device list with device identifiers for each related device to provide to pinning module 116. The device relation may be based on a common user identifier, in some examples, that identifies devices associated with a user. In other examples, the device relation may be based on a network, such as a local area network with a number of devices in communication with the local area network being related by virtue of their communication with the network. Other examples of determining device relation may include communication protocols to identify devices within a proximity or range of the device initiating the pinning or unpinning requests, broadcast requests to devices within a proximity range to determine whether a user account is associated with a device within range, identifying related devices based on a common operating system or platform, or any other suitable method of identifying related devices.

Example devices associated with a user may include a desktop computer, a laptop, a tablet, a mobile phone, a vehicle built-in interface system, a home automation system, a smart television, and a wearable computing device. In this example, a user may interact with the desktop computer in a work environment and select an application representation to assign to a user interface location, such as a start menu. Pinning module 116 detects the application selection at the desktop computer and device module 118 identifies the other devices, such as the laptop, mobile phone, and so forth, associated with the same user that selected the application representation at the desktop computer. This device identification is tied to the user, in this example, such as by user credentials, or other identifiers that tie one or more devices to a user, for example. In this example, device module 118 may generate a user device list that includes an identifier of the desktop computer, laptop, tablet, mobile phone, vehicle built-in interface system, home automation system, smart television, and wearable computing device associated with the user.

Application module 120 is a component of universal application platform 108 that identifies the application selected for pinning and determines the different devices or device types that the application or the application representation is designed to run on. In some examples, an application may be designed to run on one or more different operating systems, for example. In other examples, an application representation may be designed to run on more than one type of operating system, with varying application experiences depending upon the operating system. In some other examples, an application representation may be designed to provide different application experiences depending on the device type, even between different device types executing the same operating system. For example, an application representation may be designed to run on a specific operation system, with full dynamic data content available on one device type, and partial or limited dynamic data content available on another device type. In other examples, functionality of the application representation may be device-dependent.

Application module 120 identifies one or more device types that the application and/or application representation selected for pinning is designed to run on to generate a device type list for pinning module 116, in one illustrative example. The device type list may also include information about application experiences associated with different devices, such as a full application representation functionality for a first device type and a partial application representation functionality for a second device type.

Pinning module 116 filters the user device list generated by device module 118 with the device type list generated by application module 120 to generate a selectable device list associated with the application selection for pinning. The selectable device list includes one or more user devices specific to the user making the pinning request and compatible with the application selected, as determined by pinning module 116 from the user device list and device type list. In this way, the pinning module is able to know what devices are tied to a user, and of those user devices, which are pinnable devices for the selected application, and allow a user to pin to one or more of them in a single interaction with one device. In other illustrative examples, pinning module 116 may identify one or more devices that a user has preconfigured, or opted-in, to participate in a universal application pinning selection. In this example, pinning module 116 may identify user preferences or configuration information in addition to application compatibility information, and filter one or both of the user device list and device type list against the user preference data to generate a selectable device list.

Pinning module 116 outputs the selectable device list to the user interface associated with the device that received the initial application selection to provide for selection of at least one other device. Pinning module 116 receives a device selection via user interaction with the selectable device list, which may be a selection of one or more other user devices from the selectable device list, in order to pin or unpin an application representation associated with the application selection. For example, if the application selection is associated with a pin request, pinning module 116 pins the application representation to a same location of the user interface associated with the device that received the initial application selection and the other selected device or devices based on the received device selection. As another example, if the application selection is associated with an unpin request, pinning module 116 unpins the application representation from the user interface associated with the device that received the initial application selection and the other selected device or devices based on the received device selection.

Connectivity module 122 may receive the device selection based on user interaction with the selectable device list output to the user interface, and determine whether the one or more selected devices included in the received device selection are accessible via a communications network. Connectivity module 122 may provide an indication of the availability or network connectivity for each of the selected devices of the received device selection to pinning module 116. For example, if the device selection includes a mobile device and a laptop, and connectivity module 122 determines that the mobile device is connected to the network but the laptop is offline, the connectivity module may indicate as much to pinning module 116. Pinning module 116 may then pin the application representation to the mobile device and queue the pin request for the laptop in order to pin the application representation to the laptop at the next indication that the laptop is connected or otherwise accessible via the communications network.

In some examples, universal application platform 108 may be a cloud-based service accessible via communications network 110 by one or more user devices, such that the pinning request is received from a user device via the communications network, processed by the service, and the selectable device list returned to the user device via the communications network. In other examples, such as described above, the universal application platform 108 may be implemented on a user device to locally process an application pinning request and communicate via communications network with other user devices to pin the application representation across devices as selected.

In still other examples, a user, such as user 124, may interact with user device 126, which has universal application platform instance 128 locally stored, to pin an application to a user interface location of user device 126. User device 126 may locally store information about a user, including user device information, which may be locally cached on user device 126 and updated as network connection is available. Upon receiving the pin request, universal application platform instance 128 may determine whether a connection to communications network 110 is currently available in order to pin the application representation across other devices. If a network connection is unavailable, the device selection for application representation pinning may be locally cached at user device 126 and continued with network connectivity is available or restored, for example. Alternatively, in other example, user device 126 may communicate with universal application platform 108 periodically or when a network connection is available to discover user device information, application type information, current application selections or pin request, and other suitable information to locally cache at user device 126.

In the example of an application representation that is a live tile, with dynamic content, the live tile information may be service-based. That is, the data and updates for the live tile come from a cloud-based back-end service that is accessible by any user device to which the live tile is pinned. This access to the back-end service by the live tile on the user device may occur via a direct connection to the Internet or communications network, or via an update from another connected device, such as a phone providing an update to a wearable device for example.

Figure 2:
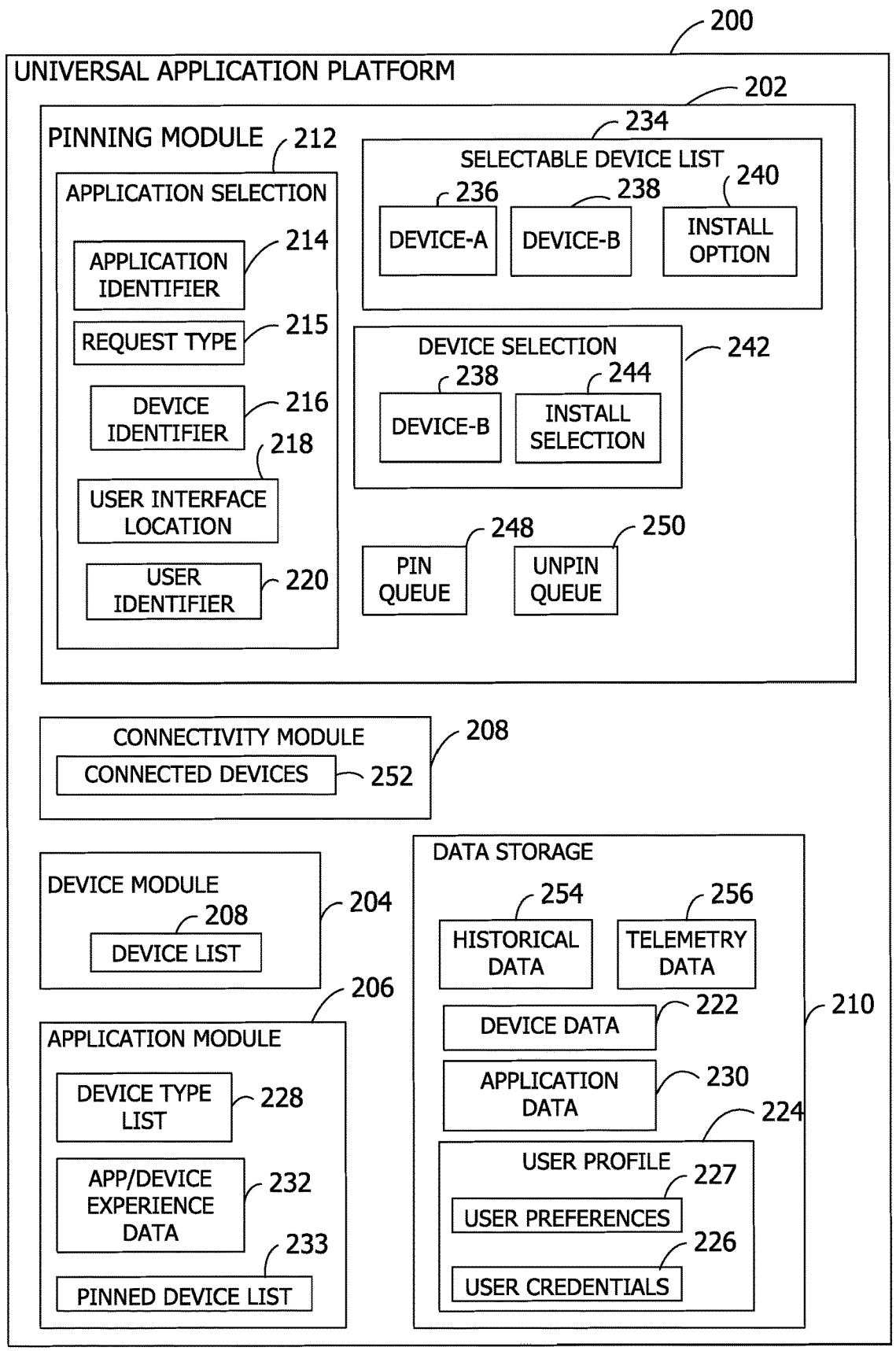
FIG. 2 is an exemplary block diagram illustrating a universal application platform for pinning an application representation.

FIG. 2 is an exemplary block diagram illustrating a universal application platform for pinning an application representation. Universal application platform 200 is an illustrative example of one implementation of universal application platform 108 in FIG. 1. In some examples, universal application platform 200 may be implemented on a user device that receives interaction via a user interface coupled to the user device. In other examples, universal application platform 200 may be implemented on a device remote from the user device that receives interaction via a user interface, and may receive information based on the user interaction via a communications network in order to process the pinning or unpinning requests. In yet another example, universal application platform 200 may be implemented as a cloud-based service communicatively coupled to one or more devices in order to receive and process pinning and unpinning requests.

Universal application platform 200 includes pinning module 202, device module 204, application module 206, connectivity module 208, and data storage 210. Pinning module 202 receives application selection 212 via user interaction with a user interface of a device. Application selection 212 includes request type 213, application identifier 214, device identifier 216, user interface location 218, and user identifier 220. Application identifier 214 identifies the application selected via the detected user interaction with the user interface of the device. Request type 215 is an indicator of whether application selection 212 is directed towards a pin request or an unpin request. Request type 215 may indicate selection of a pin command or unpin command, for example, via the detected user interaction with the user interface of the device. Device identifier 216 identifies the device associated with the user interface that received the selection of the application. User interface location 218 identifies the specific area, location, or other association with the user interface where an application representation of the identified application is to be pinned or located, or is already pinned or located, on a graphical user interface. User interface location 218 may be related to request type 215, in that a request to pin an application may have an associated user interface location that indicates a specific area or location of the user interface for pinning the application representation, where a request to unpin an application may optionally include a location of the user interface from which to unpin the application representation. User identifier 220 identifier a common user identifier or other user credential that uniquely identifies the user associated with the device that initiated application selection 212.

Device module 204 receives user identifier 220 of application selection 212 from pinning module 202, and generates user device list 208 to identify other devices associated with user identifier 220. Device module 204 may have a memory component that locally stores device data, or may access device data 222 and/or user profile 224 of data storage 210 to identify other devices associated with user identifier 220. In some examples, user profile 224 may include user credentials 226 that authenticate user identifier 220. In other examples, user profile 224 may include user preferences 227, which may include an identification of one or more devices that a user has preconfigured for universal pinning, or opted-in for universal pinning operations. Device module 204 returns user device list 208 to pinning module 202.

Application module 206 receives application identifier 214 and request type 215 of application selection 212 from pinning module 202. In an example where request type 215 indicates a pin request, application module 206 may generate device type list 228 to identify one or more device types compatible with the application identified in application selection 212. Application module 206 may have a memory component that locally stores application data, or may access application data 230 of data storage 210 to identify information about the selected application, the device types the application is designed to run on, the operating system(s) compatible with the application, and/or other device requirements for the application. Application data 230 may also include information about application experiences related to different device types, such as application representation compatibility with different device types, application representation functionality associated with different device types, and the like. Application module 206 provides device type list 228 to pinning module 202, and may optionally provide application/device experience data 232 to pinning module 202.

If an application representation is pinned to one or more devices where the full functionality of the application itself is not supported, the application representation may appear with the same or similar content as an application representation running on a device where the full functionality is supported, but may provide a user experience affordance that indicates to a user that the full functionality of that application is not available on that device, i.e. the data is view only and not interactive, for example. As one example, a weather information application may have full functionality on a mobile phone device but may have limited functionality on a wearable device. The pinning module allows a user to pin the weather application to both the phone and the wearable device, but the application representation of the weather application on the wearable device may indicate to a user that the functionality of the weather application is limited. This indication may be passive, such as providing no further action upon a detected user interaction with the application representation, i.e. a tap of the icon does not initiate further action on the wearable device, whereas a tap of the icon on the mobile phone invokes the application to provide additional information.

In an example where request type 215 indicates an unpin request, application module 206 may generate pinned device list 233 to identify one or more user devices of user device list 208 where an application representation associated with application identifier 214 is currently pinned. Application module 206 may locally store application data and/or pinned application data, or may access application data 230 of data storage 210 to identify information about the selected application and the user devices on which the selected application is currently pinned.

Pinning module 202 receives user device list 208 from device module 204 and device type list 228 from application module 206, and processes the user device list and the device type list to generate selectable device list for pinning. Selectable device list 234 may be an illustrative example of a selectable device list generated by pinning module 202 for output to a user interface. Selectable device list 234 may include one or more devices specific to a user identified by user identifier 220 of application selection 212, and compatible with the application identified by application identifier 214. In this illustrative example, selectable device list 234 includes device-A 236 and device-B 238. Selectable device list 234 may optionally include install option 240, which may provide a user selection directed to a trigger for installation of an application not already installed on a user device. For example, device-B 238 may not yet have an installed instance of the application identified in application selection 212, but may be selected for application pinning from selectable device list 234. In this illustrative example, install option 240 may provide for a user selection as to whether the application is to be installed upon pinning the application to device-B 238 or installed upon a user invoking the application representation pinned to device-B 238.

In other illustrative examples, selectable device list 234 may include one or more devices specific to a user identified by user identifier 220 of application selection 212, and identified as currently having an application representation associated with application selection 212 pinned to a corresponding user interface of the one or more devices. In this example, selectable device list 234 may provide for user selection of one or more devices to unpin an application representation from a user interface of the corresponding selected devices.

Pinning module 202 may output selectable device list 234 to the user interface associated with the detection of application selection 212, such as user interface component 114 of FIG. 1, for example. Pinning module 202 may receive device selection 242 via user interaction with selectable device list 234 in some examples. Device selection 242 may include a user-selected device for application pinning or unpinning, in this example device-B 238. Device selection 242 may optionally include install selection 244, indicating a user-selected install option for the application on a per-device basis. In other words, install selection 244 may correspond to device-B 238, however in an example where device selection 242 included another device selection, the other device selection may have an individual corresponding install selection for that device. In other examples, device selection 242 may be directed to a selection of one or more devices from selectable device list 234 to unpin an application representation associated with application identifier 214. For example, a user may determine that the device-specific functionality of an application representation is no longer desired on that device and may choose to unpin the application from specific devices while maintaining the application representation on other devices.

Pinning module 202 may automatically generate device selection 242 using selectable device list 234 and one or more criteria, such as user preference data 227, historical data 254, or telemetry data 256. User preferences 227 may include an identification of one or more devices preconfigured or preselected by a user, such as via an opt-in program, to participate in universal application pinning when applicable, such as when the identified device is also identified in selectable device list 234. Historical data 254 may include, without limitation, historical information associated with a user, historical information associated with an application, historical information associated with a device, learned information based on previous user interactions with universal application platform 200, or any other stored data associated with pinning module 202. For example, historical data 254 may include data on the devices a user pins to most frequently. Telemetry data 256 may include, without limitation, information based on user feedback associated with universal application platform 200 or information based on the interactions of other users with universal application platform 200, for example.

Connectivity module 208 provides an indication to pinning module 202 of the availability or current network connectivity associated with selected devices identified in device selection 242. In some examples, connectivity module 208 provides a list of connected devices 252 to pinning module 202, and pinning module 202 determines whether device-B 238 of device selection 242 is currently connected and available for pinning or unpinning operations. In other examples, connectivity module 208 identifies which devices of device selection 242 are available and which devices are unavailable. If a selected device is unavailable, pinning module 202 may move the pinning operation to pin queue 248, or an unpinning operation to unpin queue 250. Pin queue 248 and unpin queue 250 may periodically communicate with connectivity module 208 to identify when a selected device associated with a queued operation is available or reconnects to the network, in some examples. In other examples, user devices associated with universal application platform 200 may ping pin queue 248 and unpin queue 250 upon connecting to the network to identify any queued operations associated with the device.

Figure 3:
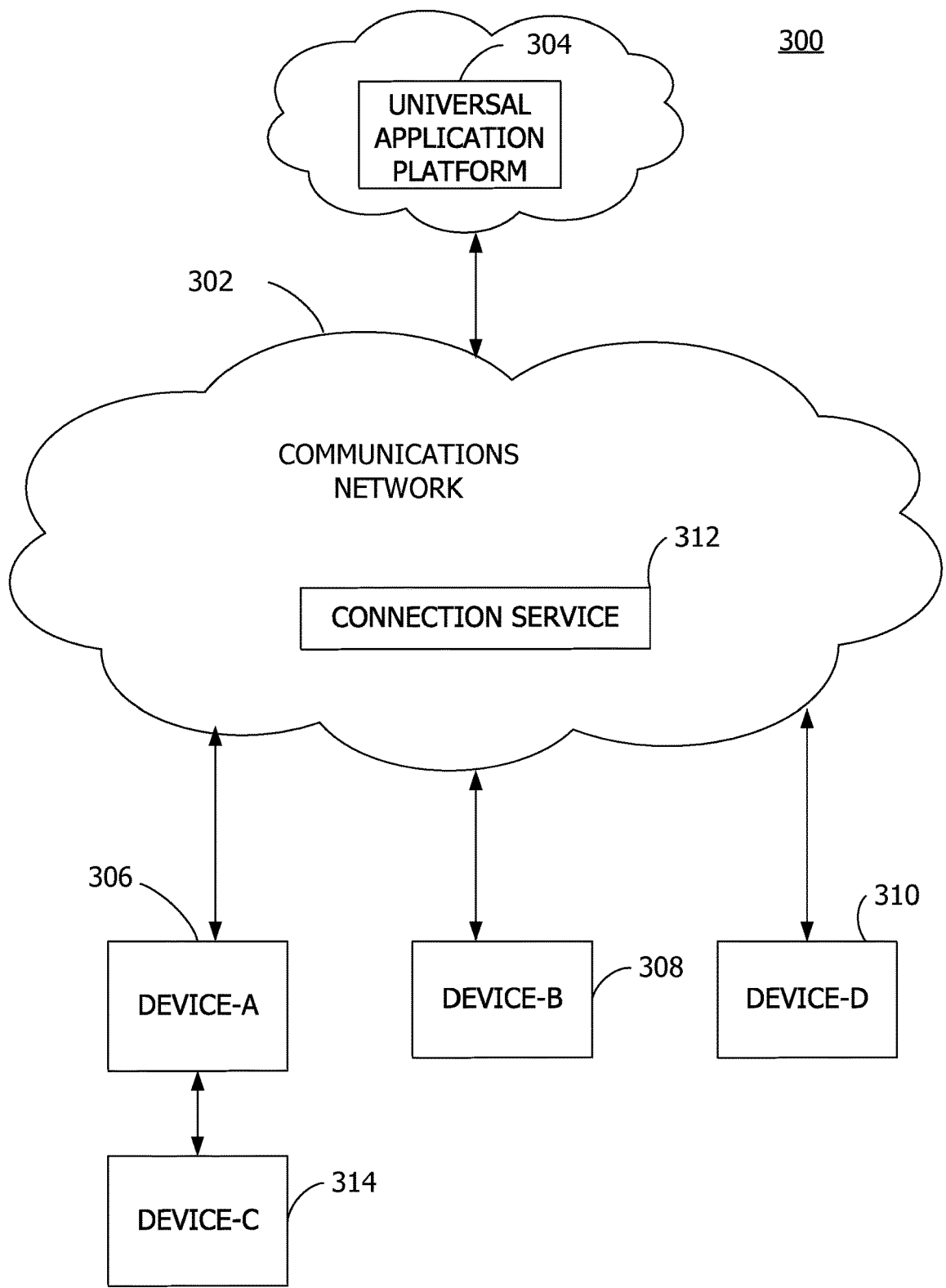
FIG. 3 is an exemplary diagram illustrating device communication with a universal application platform.

FIG. 3 is an exemplary diagram illustrating a universal application environment. Universal application environment 300 may be an illustrative example of a cloud-based implementation of universal application platform 108 in FIG. 1. Communications network 302 may be an illustrative example of one implementation of communications network 110 in FIG. 1.

In this illustrative example, universal application platform 304 is communicatively coupled to communications network 302. Device-A 306, device-B 308 and device-D 310 are communicatively coupled to universal application platform 304 via communications network 302.

Connection service 312 provides for communication between universal application platform 304 and device-A 306, device-B 308, and device-D 310, having knowledge of protocols and other information needed to communicate with these devices. Device-C 314 may be a physical object or other device without protocols needed to communicate via communications network 302, but with communication protocols that provide for communication with device-A 306, such as infrared or BLUTOOTH protocols. In this illustrative example, device-C 314 may receive application pinning operations from universal application platform 304 via device-A 306.

Figure 4:
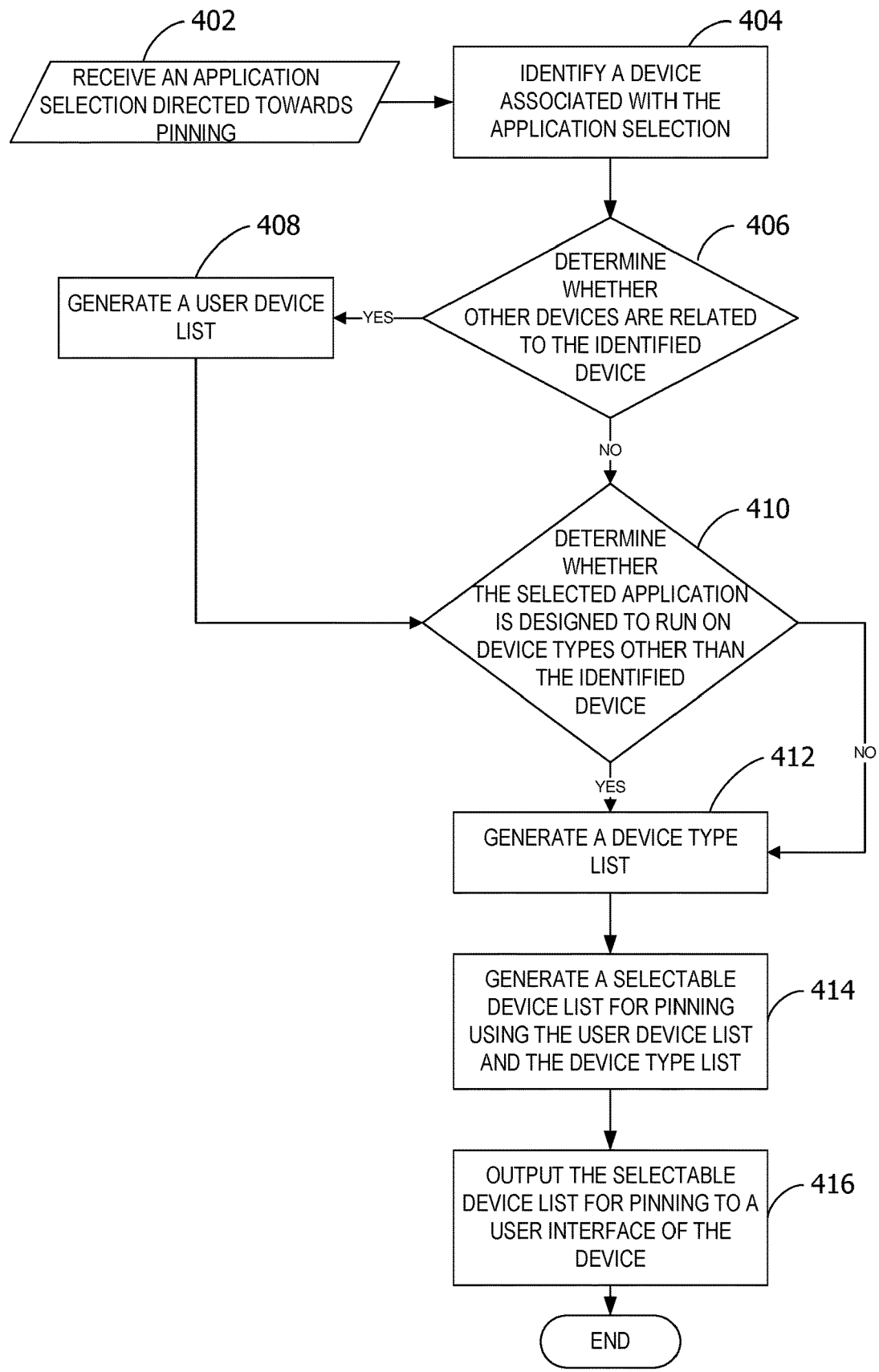
FIG. 4 is an exemplary flow chart illustrating operation of the computing device to provide a selectable device list in response to an application pinning request.

FIG. 4 is an exemplary flow chart illustrating operation of the computing device to provide a selectable device list in response to an application pinning request. The exemplary operations presented in FIG. 4 may be performed by one or more components described in FIG. 1 or FIG. 2, for example.

The process receives an application selection directed towards pinning at operation 402. The application selection may be received by a pinning module detecting user interaction with a user interface that indicates user selection of an application directed towards pinning the application, or a representation of the application, to a specific user interface location. The process identifies a device associated with the application selection at operation 404.

The process determines whether other devices are related to the identified device at operation 406. The determination of related devices may be based on a user identifier associated with the identified device, and used to identify or otherwise determine other devices associated with the same user based on the user identifier. In some examples, the user identifier may be a user credential authenticated via a user profile accessed by a device module of a universal application platform.

In response to a determination that the are other devices related to the identified device, the process generates a user device list at operation 408, listing the specific devices and device identifiers associated with the user of the identified device, and processed to operation 410. In response to a determination that there are no other user devices related to the identified device, the process proceeds to operation 410, where the process determines whether the selected application is designed to run on device types other than the identified device.

In response to identifying the device types the selected application is designed to run on, the process generates a device type list at operation 412. The process filters the user device list with the device type list to generate a selectable device list for pinning at operation 414. The process then outputs the selectable device list for pinning to a user interface of the device at operation 416, to provide for user selection of other devices to pin the selected application to a same location of a user interface across multiple devices, with the operation terminating thereafter.

Figure 5:
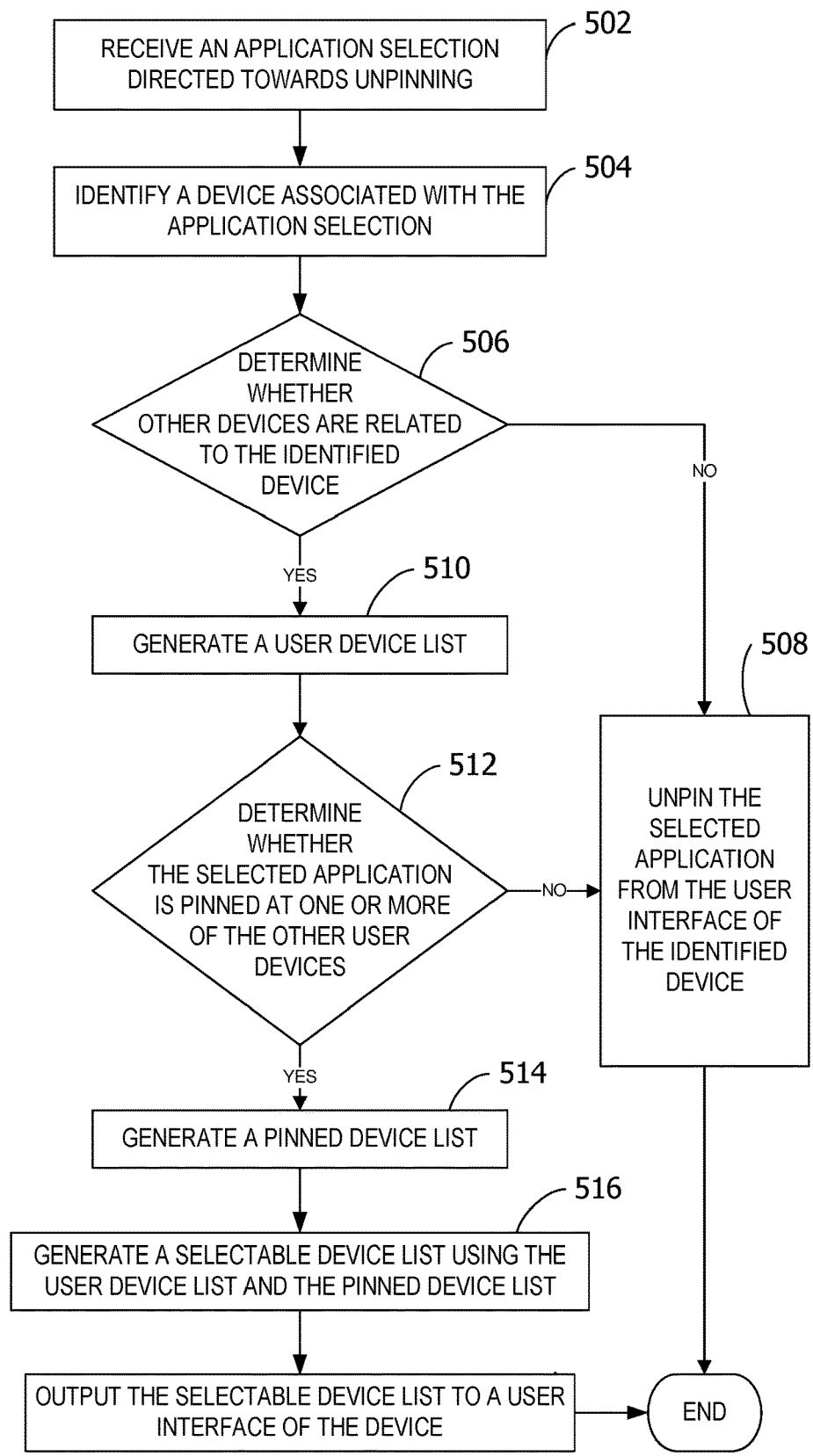
FIG. 5 is an exemplary flow chart illustrating operation of the computing device to provide a selectable device list in response to an application unpinning request

FIG. 5 is an exemplary flow chart illustrating operation of the computing device to provide a selectable device list in response to an application unpinning request. The exemplary operations presented in FIG. 5 may be performed by one or more components described in FIG. 1 or FIG. 2, for example.

The process receives an application selection directed towards unpinning at operation 502. The process identifies a device associated with the application selection at operation 504. The device associated with the application selection may be the device at which user interaction via a user interface is detected, for example.

The process determines whether other devices are related to the identified device at operation 506. The determination of related devices may be based on a user identifier associated with the identified device, and used to identify or otherwise determine other devices associated with the same user based on the user identifier. In some examples, the user identifier may be a user credential authenticated via a user profile accessed by a device module of a universal application platform.

If a determination is made that there are no other related devices, the process unpins the selected application from the user interface of the identified device at operation 508. If a determination is made that there are other devices related to the identified device, the process generates a user device list at operation 510. The user device list may be a list of the specific devices and device identifiers associated with the user of the identified device, for example.

The process determines whether the selected application is pinned at one or more of the other user devices identified in the user device list at operation 512. If a determination is made that the selected application is not pinned at another user device, the process proceeds to operation 508 and unpins the selected application from the user interface of the identified device.

If a determination is made that the selected application is pinned at one or more other user devices, the process generates a pinned device list at operation 514. The pinned device list may be a list of the specific user devices associated with the user that include an application representation associated with the selected application pinned at a user interface location. The process generates a selectable device list using the user device list and the pinned device list at operation 516, and outputs the selectable device list to a user interface of the device at operation 518, with the operation terminating thereafter.

Figure 6:
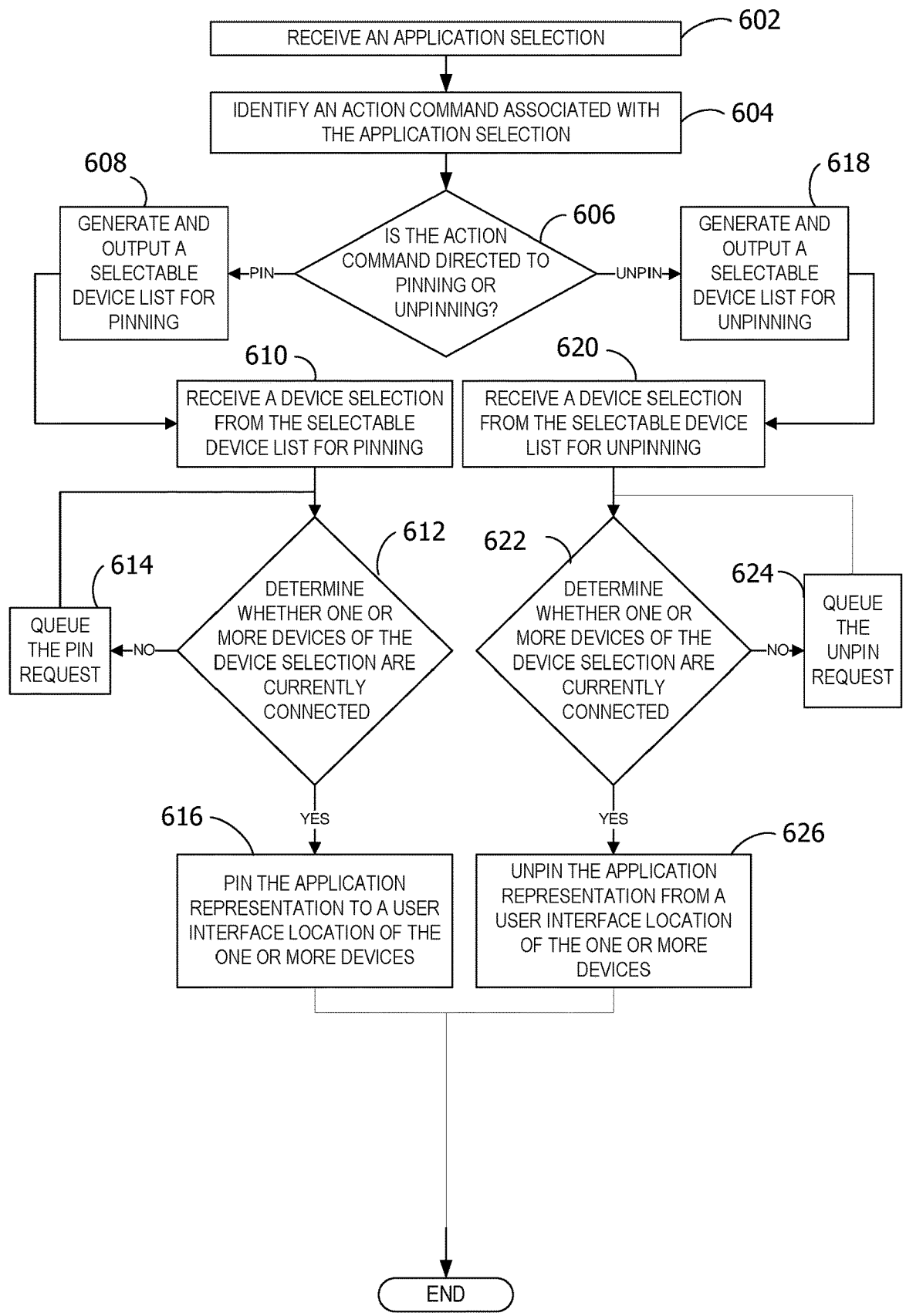
FIG. 6 is an exemplary flow chart illustrating operation of the computing device to pin or unpin an application from one or more selected devices.

FIG. 6 is an exemplary flow chart illustrating operation of the computing device to pin or unpin an application from one or more selected devices. The exemplary operations presented in FIG. 6 may be performed by one or more components described in FIG. 1 or FIG. 2, for example.

The process receives an application selection at operation 602. The process identifies an action command associated with the application selection at operation 604. The action command may be a pin request or an unpin request associated with the selected application, for example. The process determines whether the action command is directed to pinning or unpinning at operation 606.

If a determination is made that the action command is directed to a pin request, the process generates and outputs a selectable device list for pinning at operation 608. The selectable device list may be generated by the pinning module based on an application selection received via detected user interaction to pin an application to a user interface location at a device. The selectable device list may be output to the user interface of the device in response to the detected user interaction directed to pinning the application to the user interface location, to prompt a user selection of one or more other devices to pin the application to a same location across multiple user devices.

The process receives a device selection from the selectable device list for pinning at operation 610. The process determines whether the one or more devices of the device selection are currently connected or available via a connections network at operation 612. Responsive to a determination that one or more devices of the device selection are not currently connected or available to receive a pinning operation, the process queues the pin request for the one or more devices that are not currently connected at operation 614, and returns to operation 612 until the one or more devices are available for the pinning operation. Responsive to a determination that one or more devices of the device selection are currently connected or available to receive a pinning operation, the process pins the application representation to a user interface location of the one or more devices from the received device selection at operation 616.

If the process determines at operation 606 that the action command is directed to unpinning, the process generates and outputs a selectable device list for unpinning at operation 618. The process receives a device selection from the selectable device list for unpinning at operation 620.

The process determines whether one or more devices of the other device selection directed to unpinning the application are currently connected at operation 622. Responsive to a determination that one or more of the devices from the other device selection directed to unpinning the application are not connected, the process queues the unpin request at operation 624, and returns to operation 622 until the one or more devices are available for performing the unpinning operation.

Responsive to a determination that the one or more devices of the other device selection are available, the process unpins the application representation from the user interface location of the one or more devices at operation 626, with the process terminating thereafter. While the process described in FIG. 6 illustrates both pinning and unpinning operations, the illustrative flowchart is not intended to provide any limitations or requirements that all operations be performed. In some examples, a pinning operation may be performed without an unpinning operation, and vice versa. The illustrative example provides one possible implementation of the operations that may be performed by components, such as those described in FIG. 1 and FIG. 2.

Figure 7:
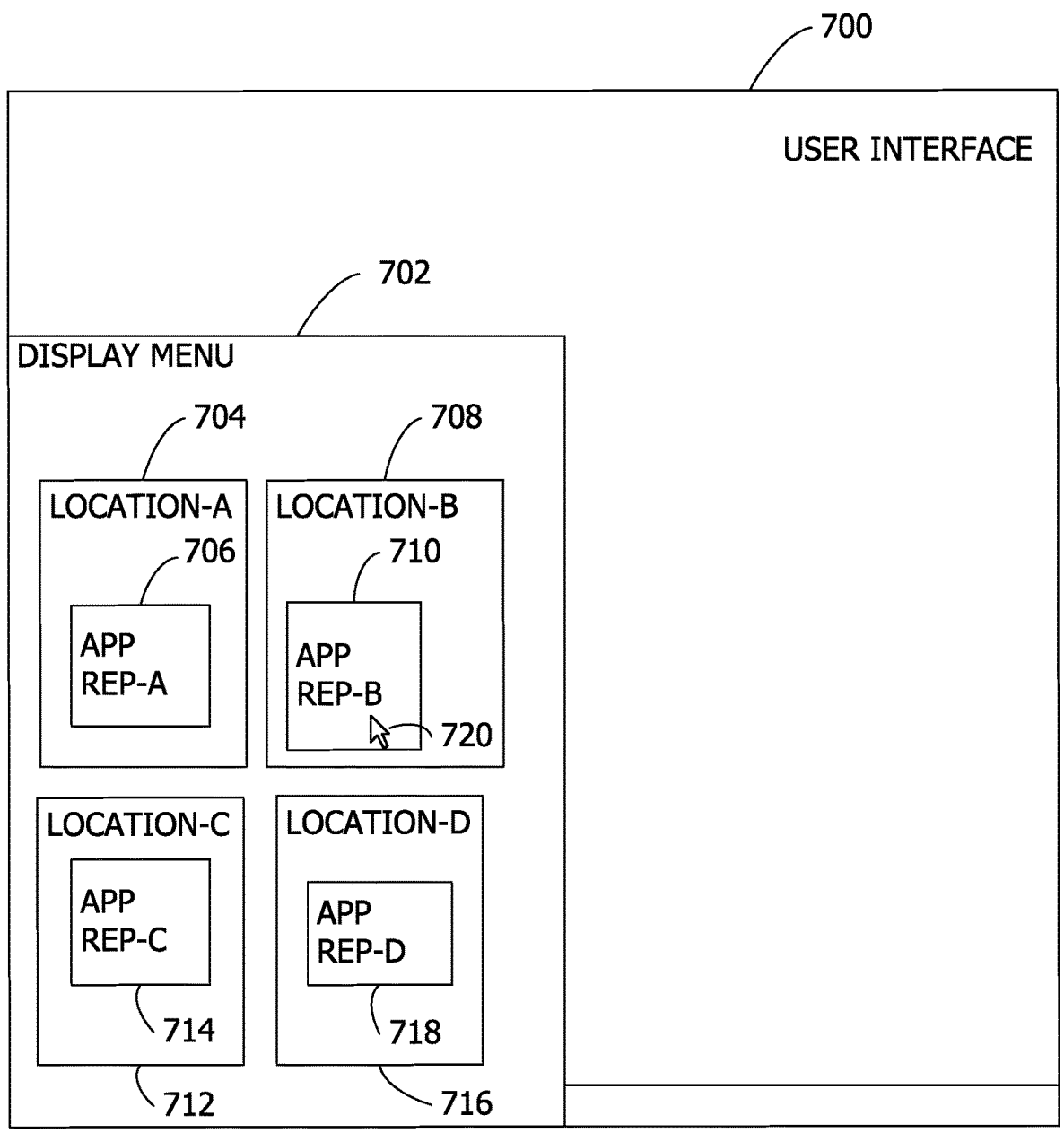
FIG. 7 is an exemplary diagram illustrating a user interface for application pinning.

FIG. 7 is an exemplary diagram illustrating a user interface for application pinning, such as user interface component 114 in FIG. 1. User interface 700 may be an illustrative example of a graphical user interface displaying application representations, for example.

User interface 700 may include a display menu 702, which may be a menu of application representations arranged according to specific user interface locations. In this example, location-A 704 is associated with application representation-A 706, location-B 708 is associated with application representation-B 710, location-C 712 is associated with application representation-C 714, and location-D 716 is associated with application representation-D 718. User selection 720, as indicated by the illustrative arrow, may have selected application representation-B 710 to pin to location-B 708 of display menu 702, for example. User selection 720 may be received by pinning module 202 of FIG. 2, for example, as application selection 212, and prompt pinning module 202 to generate selectable device list 234 for output to user interface 700 in order to drive user selection of another device to pin application representation-B 710 to a same location-B 708 of a user interface of the other device.

Figure 8:
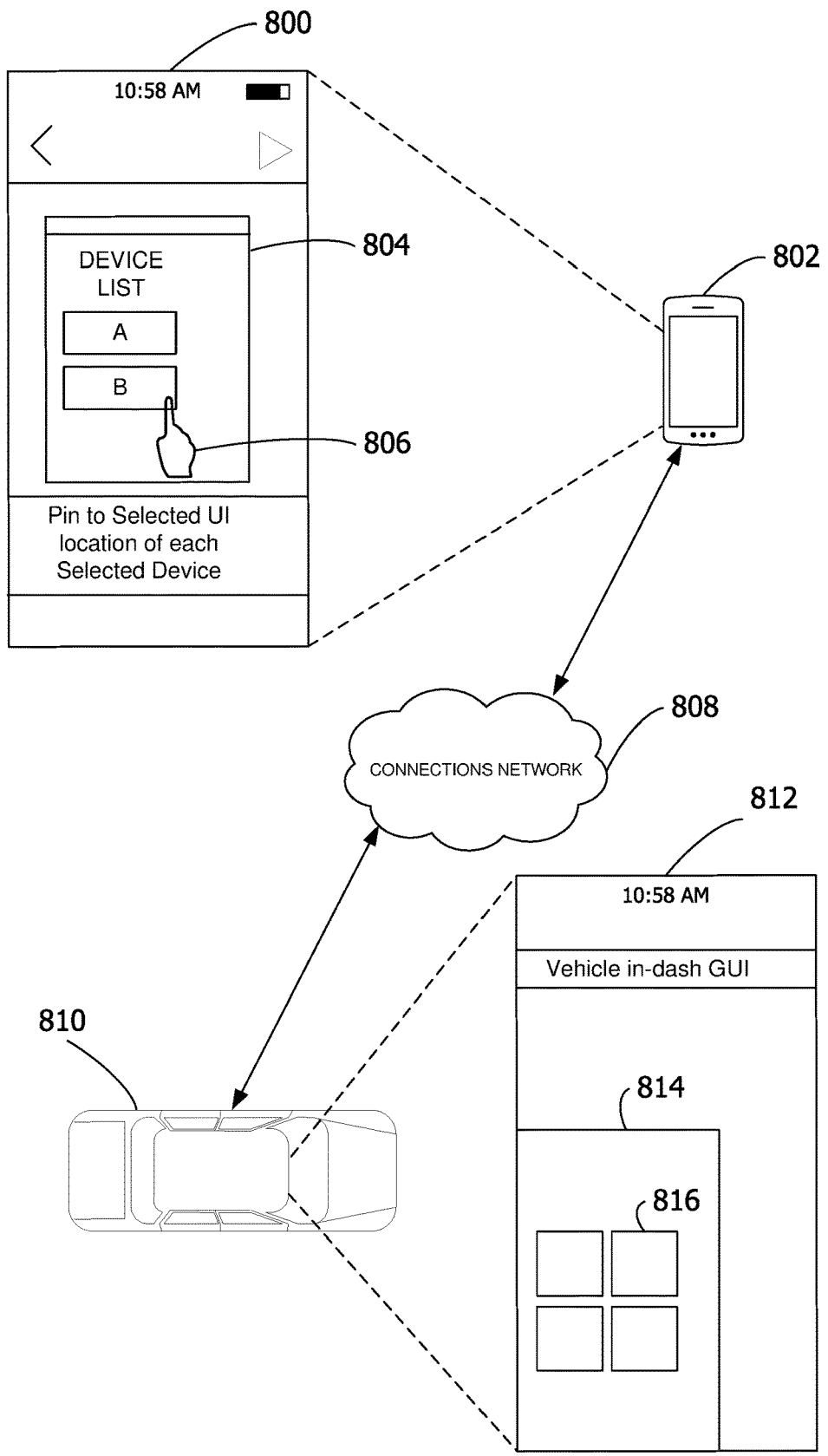
FIG. 8 is an exemplary diagram illustrating an application pinning selection applied to multiple devices via interaction with a single device.

FIG. 8 depicts an exemplary diagram illustrating an application pinning selection applied to multiple devices via interaction with a single device. User interface 800 illustrates a graphical user interface of mobile phone device 802 displaying selectable device list 804 output to user interface 800 by a pinning module, such as pinning module 202 of FIG. 2, for example. User selection 806 may be a user selection of device-B to pin a selected application to a user interface location of device-B that corresponds to a selected location of user interface 800, such as the illustrated selection of location-B 708 in FIG. 7, for example.

Mobile phone device 802 may be communicatively coupled to communications network 808. Vehicle computing system 810 may be communicatively coupled to communications network 808 and associated with mobile phone device 802 via a common user. User selection 806 of device-B may be directed to vehicle computing system 810, and the user interface location may correspond to user interface 812 of vehicle computing system 810. In this example, display menu 814 of user interface 812 may be a similar display menu as that of display menu 702 in FIG. 7. User selection 806 from selectable device list 804 may pin the selected application to the selected location of both user interface 800 and user interface 814, specifically location-B 816 of display menu 814. In this way, a user interaction to pin an application or application representation at one device may provide for user selection of one or more other devices to pin the application representation to the same location across multiple devices via interaction with a single device.

Additional Examples

In some examples, based on device type and application design corresponding to different device types, application representations may have differing functionality across multiple devices. As one example, an application representation that provides dynamic content may provide full dynamic content to an application representation running on a mobile phone device user interface, while providing partial dynamic content or truncated dynamic content to an application representation running on a wearable device user interface. This may be based in part on device resources, and/or based in part on operating system capabilities and compatibilities with the dynamic content of the application representation, for example.

In other examples, a user may not be aware of different device types that support an application or application representation, but may be provided with an opportunity to populate an application pin across multiple compatible or available devices based on interaction with one device that the user interacts with to pin an application to a user interface location. This provides for increased user interface interaction and efficiency, intuitively providing a user with device capabilities for supporting an application by providing the device in the selectable device list to a user for selection based on user interaction with an application.

Alternatively or in addition to the other examples described herein, examples include any combination of the following:
  receiving a device selection from the selectable device list output to the user interface, the device selection including an identification of one or more devices to pin the application representation to the same location of the user interface for the identified one or more devices;
  pinning the application representation to the same location of the user interface associated with the device and the user interface for the identified one or more devices of the received device selection;
  determining whether the identified one or more devices of the device selection are accessible via the communications network;
  responsive to at least one device of the identified one or more devices being inaccessible via the communications network, queuing the application representation to pin to the at least one device responsive to the at least one device connecting to the communications network;
  providing a selectable installation feature for the selectable device list, the selectable installation feature providing for a selection between installing the application on the identified one or more devices upon pinning the application representation to the location of the user interface for the identified one or more devices, or installing the application on the identified one or more devices upon user invocation of the application representation via user interaction with the application representation at the pinned location of the user interface for the identified one or more devices;
  wherein the selection of the application is received via user interaction with the user interface of the device communicatively coupled to the pinning module via the communications network;
  identifying a device experience for the application representation corresponding to an individual device type of the one or more device types that the application representation is designed to run on;
  receiving a request to unpin the application representation from the location of the user interface associated with the device;
  outputting the selectable device list to the user interface associated with the device;
  receiving another device selection based on the selectable device list output to the user interface, the other device selection including another identification of one or more devices associated with the common user identifier, the other device selection directed to unpinning the application representation from the location of the user interface for the identified one or more devices of the other device selection;
  unpinning the application representation from the same location of the user interface associated with the device and the user interface for the identified one or more devices of the received other device selection;
  wherein the selection of the application is received via user interaction with a graphical user interface of the device communicatively coupled to the pinning module via the communications network;
  receives a device selection based on the selectable device list output to the user interface, the device selection including an identification of one or more devices associated with the common user identifier, the device selection directed to pinning the application representation to the location of the user interface for the identified one or more devices of the device selection;
  pins the application representation to a same location of the user interface associated with the device and the user interface for the identified one or more devices of the received device selection;
  a connectivity module, coupled to the pinning module, that determines whether the identified one or more devices of the device selection are accessible via the communications network;
  responsive to at least one device of the identified one or more devices being inaccessible via the communications network, the pinning module queues the application representation to pin to the at least one device responsive to the at least one device connecting to the communications network;
  identifies a device experience for the application representation corresponding to an individual device type of the one or more device types that the application representation is designed to run on;
  an installation selection module, wherein the installation selection module provides a selectable installation feature for the selectable device list, the selectable installation feature providing for a selection between installing the application on the identified one or more devices upon pinning the application representation to the location of the user interface for the identified one or more devices, or installing the application on the identified one or more devices upon user invocation of the application representation via user interaction with the application representation at the pinned location of the user interface for the identified one or more devices;
  wherein the application representation is an interactive tile that displays dynamic content related to the application;
  receives a request to unpin the application representation from the location of the user interface associated with the device;
  outputs the selectable device list to the user interface associated with the device;
  receives another device selection based on the selectable device list output to the user interface, the other device selection including another identification of one or more devices associated with the common user identifier, the other device selection directed to unpinning the application representation from the location of the user interface for the identified one or more devices of the other device selection;
unpins the application representation from the same location of the user interface associated with the device and the user interface for the identified one or more devices of the received other device selection;
receives a device selection based on the selectable device list output to the user interface, the device selection including an identification of one or more devices associated with the common user identifier, the device selection directed to pinning the application representation to the location of the user interface for the identified one or more devices of the device selection;
pins the application representation to a same location of the user interface associated with the device and the user interface for the identified one or more devices of the received device selection;
a connectivity module that determines whether the identified one or more devices of the device selection are accessible via the communications network;
responsive to at least one device of the identified one or more devices being inaccessible via the communications network, the pinning module that queues the application representation to pin to the at least one device responsive to the at least one device connecting to the communications network.

In some examples, the operations illustrated in FIG. 4, FIG. 5, and FIG. 6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 9:
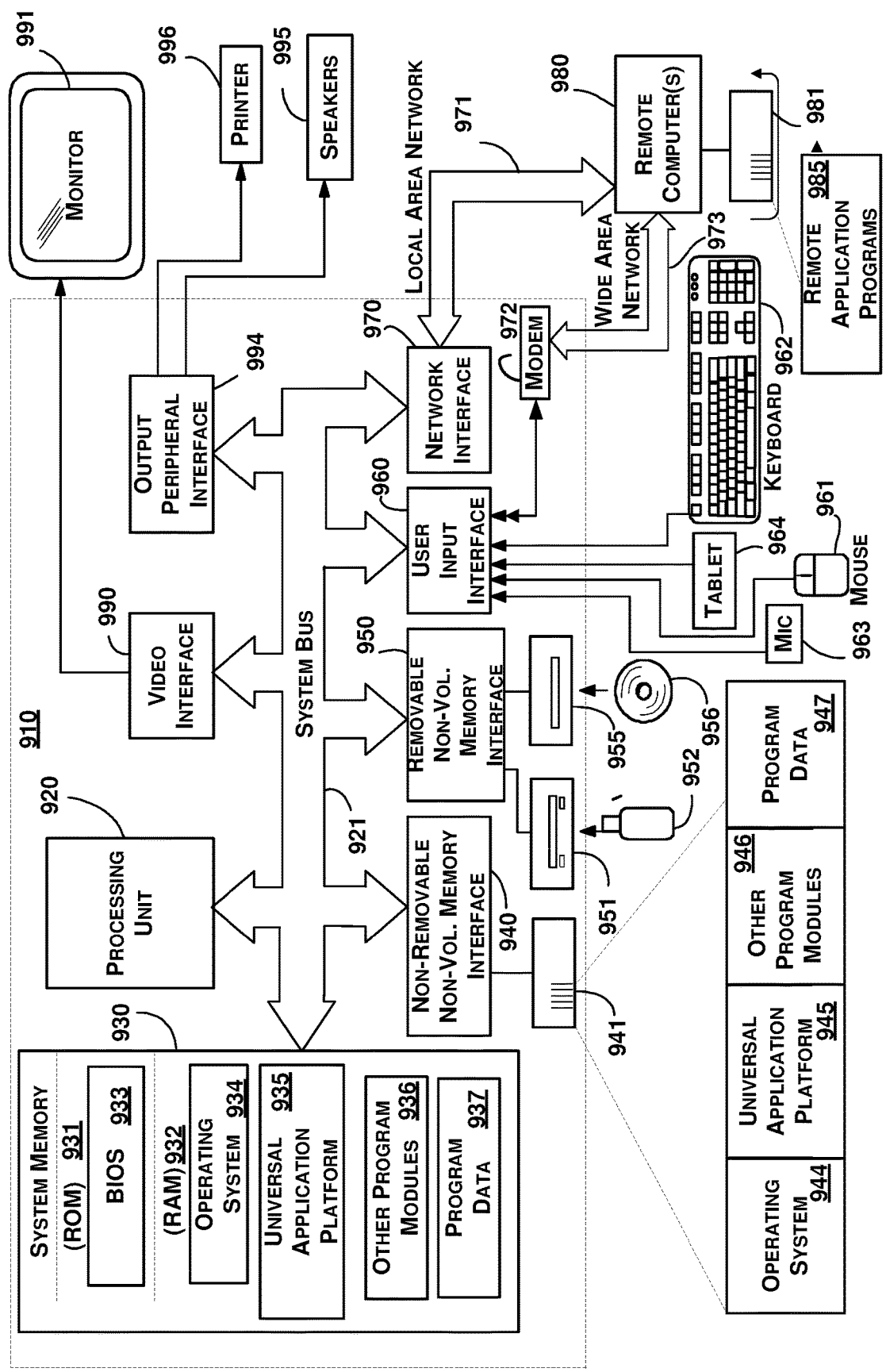
FIG. 9 is an exemplary block diagram illustrating an operating environment for a computing device implementing universal application platform.

FIG. 9 illustrates an example of a suitable computing and networking environment 900 on which the examples of FIG. 1, FIG. 2, and FIG. 3 may be implemented. The computing system environment 900 is only one example of a suitable computing environment and is not intended to suggest any limitation as to the scope of use or functionality of the disclosure. Neither should the computing environment 900 be interpreted as having any dependency or requirement relating to any one or combination of components illustrated in the exemplary operating environment 900.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 9, an exemplary system for implementing various aspects of the disclosure may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media may be any available media that may be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Memory 931 and 932 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 910. Computer storage media does not, however, include propagated signals. Rather, computer storage media excludes propagated signals. Any such computer storage media may be part of computer 910.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs, such as universal application platform 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a universal serial bus (USB) port 951 that provides for reads from or writes to a removable, nonvolatile memory 952, and an optical disk drive 955 that reads from or writes to a removable, nonvolatile optical disk 956 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and USB port 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, universal application platform 945, other program modules 946 and program data 947. Note that these components may either be the same as or different from operating system 934, universal application platform 935, other program modules 936, and program data 937. Operating system 944, universal application platform 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel may be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

Figure 10:
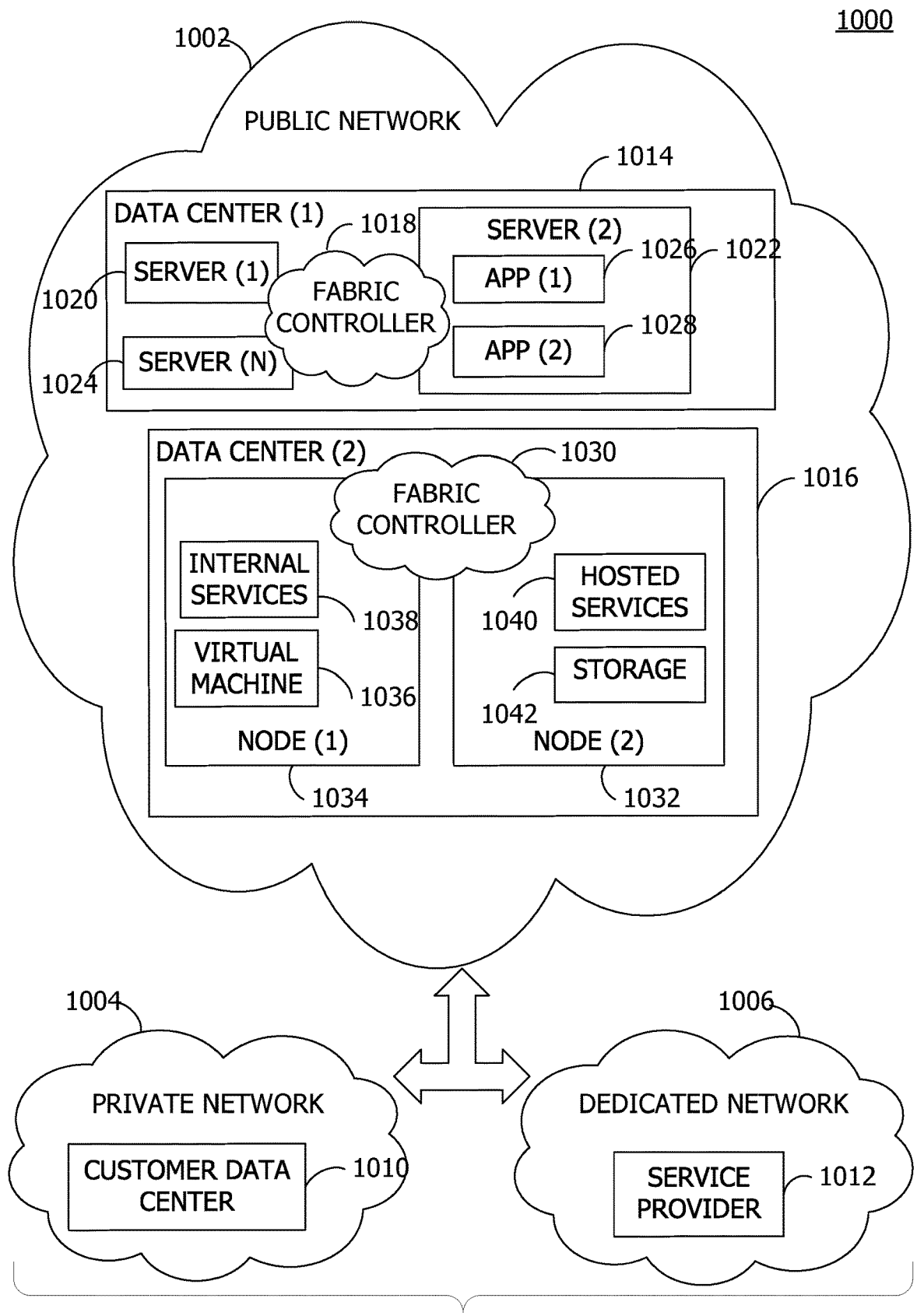
FIG. 10 is an exemplary block diagram illustrating a cloud computing environment for generating an application using a template.

With regard to FIG. 10, an exemplary block diagram illustrates a cloud-computing environment for application pinning. Architecture 1000 illustrates an exemplary cloud-computing infrastructure, suitable for use in implementing aspects of the disclosure. Architecture 1000 should not be interpreted as having any dependency or requirement related to any single component or combination of components illustrated therein. In addition, any number of nodes, virtual machines, data centers, role instances, or combinations thereof may be employed to achieve the desired functionality within the scope of examples of the present disclosure.

The distributed computing environment of FIG. 10 includes a public network 1002, a private network 1004, and a dedicated network 1006. Public network 1002 may be a public cloud, for example. Private network 1004 may be a private enterprise network or private cloud, while dedicated network 1006 may be a third party network or dedicated cloud. In this example, private network 1004 may host a customer data center 1010, and dedicated network 1006 may host an internet service provider 1012. Hybrid cloud 1008 may include any combination of public network 1002, private network 1004, and dedicated network 1006. For example, dedicated network 1006 may be optional, with hybrid cloud 1008 comprised of public network 1002 and private network 1004.

Public network 1002 may include data centers configured to host and support operations, including tasks of a distributed application, according to the fabric controller 1018. It will be understood and appreciated that data center 1014 and data center 1016 shown in FIG. 10 is merely an example of one suitable implementation for accommodating one or more distributed applications and is not intended to suggest any limitation as to the scope of use or functionality of examples of the present disclosure. Neither should data center 1014 and data center 1016 be interpreted as having any dependency or requirement related to any single resource, combination of resources, combination of servers (e.g. server 1020, server 1022, and server 1024) combination of nodes (e.g., nodes 1032 and 1034), or set of APIs to access the resources, servers, and/or nodes.

Data center 1014 illustrates a data center comprising a plurality of servers, such as server 1020, server 1022, and server 1024. A fabric controller 1018 is responsible for automatically managing the servers and distributing tasks and other resources within the data center 1014. By way of example, the fabric controller 1018 may rely on a service model (e.g., designed by a customer that owns the distributed application) to provide guidance on how, where, and when to configure server 1022 and how, where, and when to place application 1026 and application 1028 thereon. In one example, one or more role instances of a distributed application may be placed on one or more of the servers of data center 1014, where the one or more role instances may represent the portions of software, component programs, or instances of roles that participate in the distributed application. In another example, one or more of the role instances may represent stored data that is accessible to the distributed application.

Data center 1016 illustrates a data center comprising a plurality of nodes, such as node 1032 and node 1034. One or more virtual machines may run on nodes of data center 1016, such as virtual machine 1036 of node 1034 for example. Although FIG. 10 depicts a single virtual node on a single node of data center 1016, any number of virtual nodes may be implemented on any number of nodes of the data center in accordance with illustrative examples of the disclosure. Generally, virtual machine 1036 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 1036 may include processing capacity, storage locations, and other assets within the data center 1016 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 1030 is responsible for automatically managing the virtual machines running on the nodes of data center 1016 and for placing the role instances and other resources (e.g., software components) within the data center 1016. By way of example, the fabric controller 1030 may rely on a service model (e.g., designed by a customer that owns the service application) to provide guidance on how, where, and when to configure the virtual machines, such as virtual machine 1036, and how, where, and when to place the role instances thereon.

As discussed above, the virtual machines may be dynamically established and configured within one or more nodes of a data center. As illustrated herein, node 1032 and node 1034 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 1016, such as internal services 1038 and hosted services 1040. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 1002. The network cloud serves to interconnect resources, such as the role instances, which may be distributably placed across various physical hosts, such as nodes 1032 and 1034. In addition, the network cloud facilitates communication over channels connecting the role instances of the service applications running in the data center 1016. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

The examples illustrated and described herein as well as examples not specifically described herein but within the scope of aspects of the disclosure constitute exemplary means for application pinning across multiple devices based on user interaction with a single device. For example, the elements illustrated in FIG. 1 and FIG. 2, such as when encoded to perform the operations illustrated in FIG. 4 and FIG. 5, constitute exemplary means for receiving an application selection, exemplary means for outputting a selectable device list to a user interface, and exemplary means for pinning the selected application to one or more selected devices received in response to outputting the selectable device list.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for universal application pinning, the method comprising:
   receiving an application selection at a pinning module implemented on a processor, the application selection directed to pinning an application representation to a location of a user interface associated with a device;
   identifying the device associated with the user interface corresponding to the received application selection;
   determining one or more other devices related to the identified device corresponding to the received application selection to generate a user device list;
   determining one or more device types that the application representation is designed to run on to generate a device type list;
   identifying an application associated with the received application selection;
   obtaining application data associated with the identified application;
   determining one or more compatible devices for the identified application based on the one or more determined device types;
   determining one or more application experiences based on the determined one or more compatible devices and the obtained application data, wherein the application experiences include application functionality;
   generating a selectable device list based on the determined one or more compatible devices and the determined one or more application experiences; and
   outputting the selectable device list to the user interface associated with the device to provide for selection of at least one other device to pin the application representation to a substantially similar location of a user interface associated with the at least one other device, wherein the selectable device list includes information associated with the determined application experience of the at least one other device.

2. The method of claim 1, further comprising:
   receiving a device selection from the selectable device list output to the user interface, the device selection including an identification of one or more devices to pin the application representation to the substantially similar location of the user interface for the identified one or more devices; and
   pinning the application representation to the substantially similar location of the user interface associated with the device and the user interface for the identified one or more devices of the received device selection.

3. The method of claim 2, further comprising:
   determining whether the identified one or more devices of the device selection are accessible via a communications network; and
   responsive to at least one device of the identified one or more devices being inaccessible via the communications network, queuing the application representation to pin to the at least one device responsive to the at least one device connecting to the communications network.

4. The method of claim 2, further comprising:
   providing a selectable installation component for the selectable device list, the selectable installation component providing for an install selection between installing an application associated with the application selection on the identified one or more devices upon pinning the application representation to the location of the user interface for the identified one or more devices, or installing the application on the identified one or more devices upon user invocation of the application representation via user interaction with the application representation at the pinned location of the user interface for the identified one or more devices.

5. The method of claim 1, wherein the selection of the application is received via user interaction with the user interface of the device communicatively coupled to the pinning module via a communications network.

6. The method of claim 1, further comprising:
   identifying a device experience for the application representation corresponding to an individual device type of the one or more device types that the application representation is designed to run on.

7. The method of claim 6, further comprising:
   receiving a request to unpin the application representation from the location of the user interface associated with the device;
   outputting the selectable device list to the user interface associated with the device;
   receiving another device selection based on the selectable device list output to the user interface, the other device selection including another identification of one or more devices associated with a common user identifier, the other device selection directed to unpinning the application representation from the location of the user interface for the identified one or more devices of the other device selection; and
   unpinning the application representation from the location of the user interface associated with the device and the user interface for the identified one or more devices of the received other device selection.

8. A system for universal application pinning, the system comprising:
   a processor communicatively coupled to a communications network;
   a pinning module, implemented on the processor, that receives an application selection via the communications network from a device, the application selection directed to pinning an application representation to a location of a user interface associated with the device;
   a device module, implemented on the processor, that identifies the device associated with the user interface corresponding to the received application selection, identifies one or more other devices related to the identified device corresponding to the received application selection, and generates a user device list of the identified one or more other devices related to the identified device to the pinning module; and an application module, implemented on the processor, that obtains the generated user device list and the received application selection, identifies an application based on the received application selection, obtains application data associated with the identified application, determines one or more compatible device types that an application representation associated with the identified application is designed to run on, determines one or more application experiences based on the determined one or more compatible device types and the obtained application data, and generates a device type list based on the determined one or more compatible device types, wherein the application experiences include application functionality, wherein the pinning module obtains the user device list and the device type list, generates a selectable device list based on the user device list and the device type list, and outputs the generated selectable device list to the device via the communications network, and wherein the selectable device list includes information associated with the determined application experience of the or more other devices.

9. The system of claim 8, wherein the selection of the application is received via user interaction with a graphical user interface of the device communicatively coupled to the pinning module via the communications network.

10. The system of claim 8, wherein the pinning module further:

automatically generates a device selection based on the selectable device list and one or more criteria, the device selection including an identification of one or more devices; and pins the application representation to a location of the user interface associated with the device and a location of the user interface for the identified one or more devices of the device selection.

11. The system of claim 10, wherein the one or more criteria include at least one of user preference data, machine learning data, or telemetry data.

12. The system of claim 10, further comprising:

a connectivity module, implemented on the processor and coupled to the pinning module, that determines whether the identified one or more devices of the device selection are accessible via the communications network; and responsive to at least one device of the identified one or more devices being inaccessible via the communications network, the pinning module queues the application representation to pin to the at least one device responsive to the at least one device connecting to the communications network.

13. The system of claim 10 further comprising:

an installation selection module, implemented on the processor, wherein the installation selection module provides a selectable installation feature for the selectable device list, the selectable installation feature providing for a selection between installing the application on the identified one or more devices upon pinning the application representation to the location of the user interface for the identified one or more devices, or installing the application on the identified one or more devices upon user invocation of the application representation via user interaction with the application representation at the pinned location of the user interface for the identified one or more devices.

14. The system of claim 8, wherein the pinning module further:

receives a request to unpin the application representation from the location of the user interface associated with the device;

generates a selectable device list for unpinning;

automatically generates another device selection based on the selectable device list for unpinning, the other device selection including another identification of one or more devices; and unpins the application representation from the location of the user interface associated with the device and the user interface for the identified one or more devices of the other device selection.

15. One or more computer storage devices having computer-executable instructions stored thereon for generating an application, which, on execution by a computer, cause the computer to perform operations comprising:

receiving an application selection, the application selection directed to pinning an application representation to a location of a user interface associated with a first device;

identifying the first device associated with the user interface corresponding to the received application selection;

determining one or more other devices related to the identified device corresponding to the received application selection;

generating a selectable device list based on the determined one or more other devices;

identifying the selected application;

obtaining application data associated with the identified application;

determining one or more device types that the identified application is designed to run on;

determining one or more application experiences based on the determined one or more device types and the obtained application data, wherein the application experiences include application functionality;

generating a selectable device list based on the determined one or more device types and the determined one or more application experiences; and outputting the selectable device list to provide for selection of at least one other device to pin the application representation to a substantially similar location of a user interface associated with the at least one other device, wherein the selectable device list includes information associated with the determined application experience of the at least one other device.

16. The one or more computer storage devices of claim 15, further comprising:

a pinning module, implemented on a processor, that:

receives a device selection based on the selectable device list output to the user interface, the device selection including an identification of one or more devices, the device selection directed to pinning the application representation to the location of the user interface for the identified one or more devices of the device selection; and pins the application representation to a same location of the user interface associated with the device and the user interface for the identified one or more devices of the received device selection.

17. The one or more computer storage devices of claim 15, further comprising:

a connectivity module, implemented on a processor, that determines whether the identified one or more devices of the device selection are accessible via a communications network; and responsive to at least one device of the identified one or more devices being inaccessible via the communications network, a pinning module that queues the application representation to pin to the at least one device responsive to the at least one device connecting to the communications network.

18. The one or more computer storage devices of claim 15, further comprising:

an installation selection module, implemented on a processor, that provides a selectable installation feature for the selectable device list, the selectable installation feature providing for a selection between installing the application on the identified one or more devices upon pinning the application representation to the location of the user interface for the identified one or more devices, or installing the application on the identified one or more devices upon user invocation of the application representation via user interaction with the application representation at the pinned location of the user interface for the identified one or more devices.

19. The one or more computer storage devices of claim 18, further comprising:

a pinning module, implemented on a processor, that:

receives a request to unpin the application representation from the location of the user interface associated with the device;

outputs the selectable device list to the user interface associated with the device;

receives another device selection based on the selectable device list output to the user interface, the other device selection including another identification of one or more devices, the other device selection directed to unpinning the application representation from the location of the user interface for the identified one or more devices of the device selection; and unpins the application representation from the same location of the user interface associated with the device and the user interface for the identified one or more devices of the received other device selection.

20. The method of claim 1, wherein the information associated with the determined application experience of the at least one other device indicates an amount of application functionality offered.

* * * * *